US006982691B2

(12) United States Patent
Lee et al.

(10) Patent No.: US 6,982,691 B2
(45) Date of Patent: Jan. 3, 2006

(54) METHOD OF DRIVING CHOLESTERIC LIQUID CRYSTAL DISPLAY PANEL FOR ACCURATE GRAY-SCALE DISPLAY

(75) Inventors: Nam-Seok Lee, Suwon (KR); Woon-Seop Choi, Seoul (KR); Hee-Jung Lee, Seongnam (KR); Min-Kyu Kim, Pohang (KR); Hyun-Soo Shin, Seoul (KR)

(73) Assignee: Samsung SDI, Co., Ltd., Suwon-si (KR)

( * ) Notice: Subject to any disclaimer, the term of this patent is extended or adjusted under 35 U.S.C. 154(b) by 335 days.

(21) Appl. No.: 10/247,551

(22) Filed: Sep. 20, 2002

(65) Prior Publication Data

US 2003/0122758 A1 Jul. 3, 2003

(30) Foreign Application Priority Data

Dec. 27, 2001 (KR) ....................................... 2001-85908

(51) Int. Cl.
*G09G 3/28* (2006.01)
*G09G 3/36* (2006.01)
*G02F 1/133* (2006.01)

(52) U.S. Cl. .............................. 345/89; 345/63; 349/33

(58) Field of Classification Search ................... 345/63, 345/89; 349/33–35

See application file for complete search history.

(56) References Cited

U.S. PATENT DOCUMENTS 4,705,345 A * 11/1987 Ayliffe et al. ................. 345/97
4,909,607 A * 3/1990 Ross ........................... 345/94
5,260,699 A * 11/1993 Lister et al. .................. 345/97
5,285,214 A * 2/1994 Bowry ......................... 345/97
5,289,175 A * 2/1994 Kawagishi ................... 345/97
5,594,464 A * 1/1997 Tanaka et al. ................ 345/94
5,748,277 A 5/1998 Huang et al.
6,154,190 A 11/2000 Yang et al.
6,278,429 B1 * 8/2001 Ruth et al. .................... 345/94
6,812,913 B2 * 11/2004 Masazumi et al. ............ 345/94

* cited by examiner

*Primary Examiner*—Xiao Wu
*Assistant Examiner*—M. Fatahiyar
(74) *Attorney, Agent, or Firm*—Robert E. Bushnell, Esq.

(57) ABSTRACT

There is provided a method of driving a cholesteric liquid crystal display (LCD) panel by sequentially applying a selection line voltage to individual scan electrode lines and simultaneously applying data signals to all data electrode lines in order to select a state of each cholesteric liquid crystal cell according to a given gray scale level. Each selection time, during which the selection line voltage is applied to a certain scan electrode line and simultaneously the data signals are applied to all of the data electrode lines, is constant. Each selection time is divided into a first part time and a second part time. A low selection line voltage is applied to a relevant scan electrode line during the first part time. A high selection line voltage having a level different from that of the low selection line voltage is applied to the relevant scan electrode line during the second part time. A data pulse having a width corresponding to either the first part time or the second part time is applied to all of the data electrode lines at different time points according to the gray scale level of a relevant cholesteric liquid crystal cell during the selection time.

20 Claims, 5 Drawing Sheets

METHOD OF DRIVING CHOLESTERIC LIQUID CRYSTAL DISPLAY PANEL FOR ACCURATE GRAY-SCALE DISPLAY

CLAIM OF PRIORITY

This application makes reference to, incorporates the same herein, and claims all benefits accruing under 35 U.S.C. §119 from my application METHOD OF DRIVING CHOLESTRIC LIQUID CRYSTAL DISPLAY PANEL FOR ACCURATE GRAY-SCALE DISPLAY filed with the Korean Industrial Property Office on Dec. 27, 2001 and there duly assigned Serial No. 2001-0085908.

BACKGROUND OF THE INVENTION

1. Technical Field

The present invention relates to a method of driving a cholesteric liquid crystal display panel, and more particularly, to a method of driving a cholesteric liquid crystal display panel causing the state of each cholesteric liquid crystal cell to be selected according to a given gray scale level.

2. Related Art

Cholesteric liquid crystal display (LCD) panels are reflective liquid crystal display panels having a structure in which cholesteric liquid crystal is filled among transparent electrode lines formed of, for example, indium-tin-oxide (ITO), which are arranged on two transparent substrates, for example, glass substrates, facing each other.

Liquid crystal displays can be vulnerable to crosstalk which can occur while driving a matrix liquid crystal display panel. In addition, the gray scale may not be accurately displayed.

I have found that crosstalk and inaccurate display of gray scale is particularly undesirable due to a lack of image display quality. Efforts have been made to improve liquid crystal display panels.

Exemplars of recent efforts in the art include U.S. Pat. No. 5,748,277 for DYNAMIC DRIVE METHOD AND APPARATUS FOR A BISTABLE LIQUID CRYSTAL DISPLAY issued on May 5, 1998 to Huang et al. and U.S. Pat. No. 6,154,190 for DYNAMIC DRIVE METHODS AND APPARATUS FOR A BISTABLE LIQUID CRYSTAL DISPLAY issued on 28 Nov. 2000 to Yang et al.

While these recent efforts provide advantages, I note that they fail to adequately provide an improved method of driving a cholesteric liquid crystal display panel for accurate gray scale display.

SUMMARY OF THE INVENTION

To solve the above-described problems, it is an object of the present invention to provide an improved method of driving a cholesteric liquid crystal display (LCD) panel, and it is an object of the present invention to provide an improved method of driving a cholesteric liquid crystal display panel through which gray scale can be accurately displayed by removing the influence of crosstalk.

To achieve the above objects and others, the present invention provides a method of driving a liquid crystal display panel by sequentially applying a selection line voltage to individual scan electrode lines and simultaneously applying data signals to all data electrode lines in order to select a state of each cholesteric liquid crystal cell according to a given or predetermined gray scale level. Each selection time, during which the selection line voltage is applied to a certain scan electrode line and simultaneously the data signals are applied to all of the data electrode lines, is constant. Each selection time is divided into a first part time and a second part time. A low selection line voltage is applied to a relevant scan electrode line during the first part time. A high selection line voltage having a different level from the low selection line voltage is applied to the relevant scan electrode line during the second part time. A data pulse having a width corresponding to either the first part time or the second part time is applied to all of the data electrode lines at different time points according to the gray scale level of a relevant cholesteric liquid crystal cell during the selection time.

In a method of driving a cholesteric liquid crystal display panel according to the present invention, since only the application time point of the data pulse having a width corresponding to half of the selection time varies with gray scale, a root-mean-square (RMS) voltage, which is applied to all data electrode lines during a unit selection time, is constant regardless of the gray scale. Consequently, a voltage which is applied to cholesteric liquid crystal cells of scan electrode lines which are not scanned is constant, thereby removing crosstalk. Therefore, accurate gray-scale display can be accomplished.

To achieve these and other objects in accordance with the principles of the present invention, as embodied and broadly described, the present invention provides a method of driving a cholesteric liquid crystal display panel having cholesteric liquid crystal cells, the method comprising: during a selection time, applying at least one selection line voltage to a particular scan electrode line of the panel and substantially simultaneously applying data signals to all data electrode lines in order to select a state of the cholesteric liquid crystal cells in dependence upon a predetermined gray scale level, the selection time being a constant, the selection time being divided into a first part of the selection time and a second part of the selection time; said applying of the at least one selection line voltage further comprising: applying a low selection line voltage during the first part; and applying a high selection line voltage during the second part, the high selection line voltage having a different level than the low selection line voltage; said applying of the data signals further comprising applying a data pulse to all the data electrode lines at different time points, the different time points being selected in dependence upon gray scale levels of respective ones of the cholesteric liquid crystal cells, the data pulse having a width corresponding to one selected from among the first part and the second part.

To achieve these and other objects in accordance with the principles of the present invention, as embodied and broadly described, the present invention provides a method of driving a liquid crystal display panel, the method comprising: during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level, the selection time being a constant, the selection time being divided into a first part of the selection time and a second part of the selection time; said applying of the data signals further comprising applying a data pulse to all the data electrode lines at different time points, the different time points being selected in dependence upon gray scale levels of respective ones of the cholesteric liquid crystal cells, the data pulse having a width corresponding to one selected from among the first part and the second part.

To achieve these and other objects in accordance with the principles of the present invention, as embodied and broadly described, the present invention provides a method of driving a cholesteric liquid crystal display panel, the method comprising: during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level, the selection time being a constant, the selection time being divided into a first part of the selection time and a second part of the selection time; said applying of the at least one selection line voltage further comprising: applying a low selection line voltage during the first part; and applying a high selection line voltage during the second part, the high selection line voltage having a different level than the low selection line voltage.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
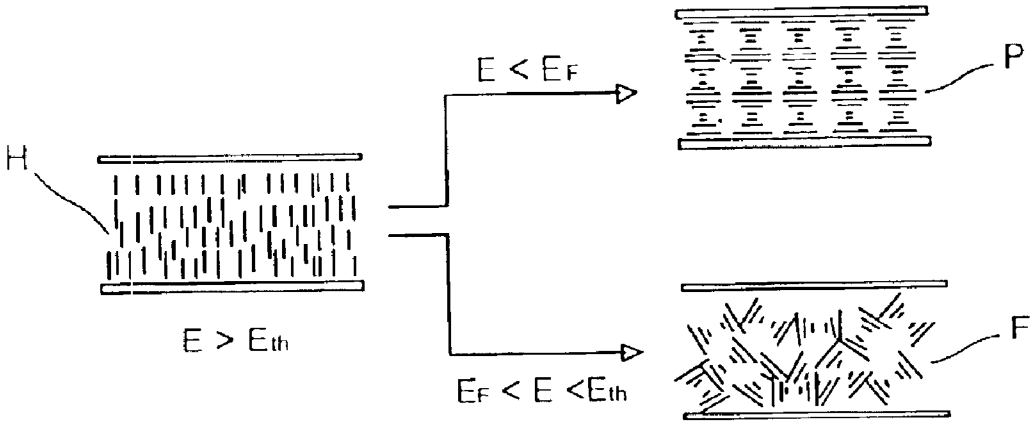
FIG. 1 shows the fundamental characteristics of a cholesteric liquid crystal cell.

FIG. 1 shows the fundamental characteristics of a cholesteric liquid crystal cell. Referring to FIG. 1, when a voltage E higher than a first threshold voltage $E_{th}$ is applied to a cholesteric liquid crystal cell, the cholesteric liquid crystal changes into a homeotropic state H. In the homeotropic state H, molecules of the cell are vertically arranged with respect to the surface of the cell.

When the voltage E, which is lower than the first threshold voltage $E_{th}$ and is higher than a second threshold voltage $E_F$, is applied to the cholesteric liquid crystal cell in the homeotropic state H, specifically, when the voltage E that is applied to the cell in the homeotropic state H is gradually lowered, the cell changes from the homeotropic state H into a focal conic state F. In the focal conic state F, the molecules of the cell are arranged in a helical structure, and a helical axis is nearly parallel to the surface of the cell. Accordingly, light is mostly transmitted without being reflected so that the cell is almost transparent.

When the voltage E lower than the second threshold voltage $E_F$ is applied to the cholesteric liquid crystal cell in the homeotropic state H, specifically, when the voltage E that is applied to the cell in the homeotropic state H is rapidly lowered, the cell changes from the homeotropic state H via a transient planar state and incomplete-planar state into a planar state P. In the planar state P, the molecules of the cell have a periodic helical structure, and a helical axis is perpendicular to the surface of the cell. Accordingly, only light having a wavelength corresponding to the product nP of an average refractive index "n" of the cholesteric liquid crystal cell and a helical pitch P can be reflected. Meanwhile, the transient-planar state has a structure similar to that of the planar state P, and has a helical pitch which is about twice longer than that of the planar state P. The incomplete-planar state is a variable state appearing in the middle of relaxation from the transient-planar state into the planar state P.

The focal conic state F and the planar state P have a memory effect through which the states are maintained for a long period of time even if supply of voltage is stopped. Due to such memory effect produced by bistability, the planar state P and the focal conic state F are employed depending on selection of a certain cholesteric liquid crystal cell in cholesteric liquid crystal display panels, thereby decreasing power consumption. In addition, since cholesteric liquid crystal display panels use a selective reflection driving scheme due to their characteristics, they have a high luminance characteristic.

Figure 2:
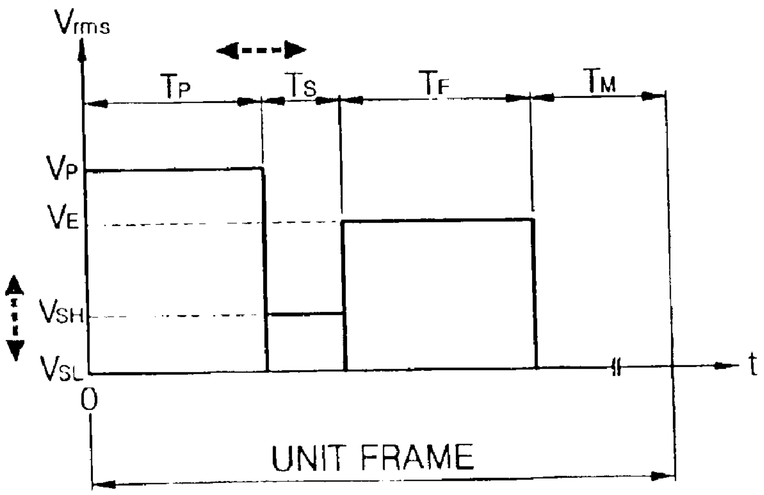
FIG. 2 is a conceptual timing diagram for explaining a dynamic driving method for a cholesteric liquid crystal display (LCD) panel.

FIG. 2 is a conceptual timing diagram for explaining a dynamic driving method for a cholesteric liquid crystal display panel. A dynamic driving method is described in detail in U.S. Pat. Nos. 5,748,277 and 6,154,190. The dynamic driving method described in U.S. Pat. Nos. 5,748, 277 and 6,154,190 could be useful to refer to for information generally relating to the dynamic driving method shown in FIG. 2. However, the dynamic driving method described in U.S. Pat. Nos. 5,748,277 and 6,154,190 is not identical in every respect to the dynamic driving method shown in FIG 2.

Referring to FIG. 2, a unit frame, which is applied to each row electrode line, i.e., each scan electrode line, includes a preparation time $T_P$, a selection time $T_S$, an evolution time $T_E$, and a maintenance time $T_M$.

During the preparation time $T_P$, a preparation cell voltage $V_P$, i.e., a first voltage, is applied to all cholesteric liquid crystal cells of a certain scan electrode line in a cholesteric liquid crystal display panel, thereby changing all of the cholesteric liquid crystal cells into the homeotropic state H shown in FIG. 1.

During the selection time $T_S$, a second voltage $V_{SH}$ lower than the first voltage $V_P$ is applied to all cholesteric liquid crystal cells of the scan electrode line, and the second voltage $V_{SH}$ or the pulse width $T_S$ of the second voltage $V_{SH}$ are changed according to the gray scale of each cholesteric liquid crystal cell in a voltage modulation mode or time modulation mode. For example, to cholesteric liquid crystal cells having the highest gray scale level is applied the highest second voltage $V_{SH}$ during the selection time $T_S$ or the constant second voltage $V_{SH}$ during the longest selection time $T_S$.

Accordingly, the cholesteric liquid crystal cells having the highest gray scale level maintain the homeotropic state H shown in FIG. 1, and the cholesteric liquid crystal cells having the lowest gray scale level relax into the transient-planar state. Cholesteric liquid crystal cells having other gray scale levels change into a state similar to the homeotropic state H as the gray scale level increases and change into a state to similar the transient-planar state as the gray scale level decreases. The gray-scale display method shown in FIG. 2 has a problem in that the voltages $V_P$, $V_E$, and $V_{SL}$, which are applied during the preparation time $T_P$, the evolution time $T_E$, and the maintenance time $T_M$, respectively, vary according to data signals which are applied to all data electrode lines during a selection time for each scan line. In other words, the method shown in FIG. 2 is vulnerable to crosstalk which inevitably occurs while driving a matrix liquid crystal display panel. In addition, since the evolution cell voltage $V_E$ changes during the evolution time $T_E$, the gray scale is not accurately displayed.

During the evolution time $T_E$, the evolution cell voltage $V_E$, i.e., a fourth voltage, which is lower than the first voltage $V_P$ and is higher than the second voltage $V_{SH}$, is applied to all of the cholesteric liquid crystal cells. Accordingly, the cholesteric liquid crystal cells having the highest gray scale level continuously maintain the homeotropic state H, and the cholesteric liquid crystal cells having the lowest gray scale level change into the focal conic state F shown in FIG. 1. The cholesteric liquid crystal cells having other gray scale levels change into a state similar to the homeotropic state H as the gray scale level increases and change into a state similar to the focal conic state F as the gray scale level decreases.

During the maintenance time $T_M$, a maintenance cell voltage equal to a third voltage $V_{SL}$ is applied to all of the cholesteric liquid crystal cells so that the cholesteric liquid crystal cells having the highest gray scale level relax into the planar state P shown in FIG. 1, and the cholesteric liquid crystal cells having the lowest gray scale level maintain the focal conic state F. The cholesteric liquid crystal cells having other gray scale levels change into a state similar to the planar state P as the gray scale level increases and change into a state similar to the focal conic state F as the gray scale level decreases. Accordingly, the cholesteric liquid crystal cells having the highest gray scale level reflect a largest quantity of light having a wavelength corresponding to the product nP of an average refractive index "n" and a helical pitch P. However, the cholesteric liquid crystal cells having the lowest gray scale level transmit most of light in an almost transparent state. The cholesteric liquid crystal cells having other gray scale levels have higher reflectivity as the gray scale level increases, and have lower reflectivity as the gray scale level decreases.

According to the above-described method of driving a cholesteric liquid crystal display panel as shown in FIG. 2, the voltages $V_P$, $V_E$, and $V_{SL}$, which are applied during the preparation time $T_P$, the evolution time $T_E$, and the maintenance time $T_M$, respectively, vary according to data signals which are applied to all data electrode lines during a selection time for each scan line. In other words, the method of FIG. 2 is vulnerable to crosstalk which inevitably occurs while driving a matrix liquid crystal display panel. In addition, since the evolution cell voltage $V_E$ changes during the evolution time $T_E$, the gray scale is not accurately displayed.

Figure 3:
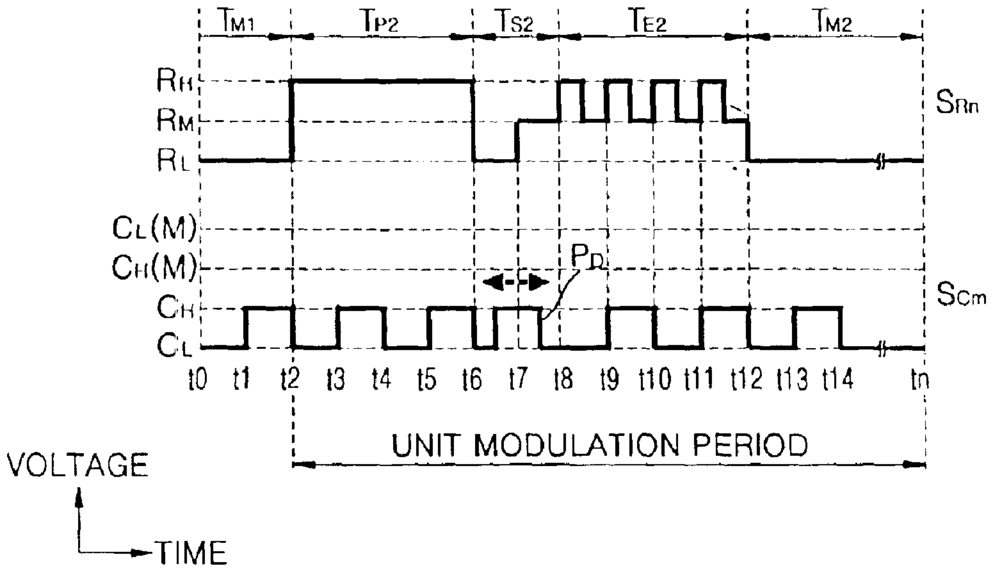
FIG. 3 is a timing diagram for explaining a method of dynamically driving a cholesteric liquid crystal display panel, in accordance with the principles of the present invention.
Figure 4:
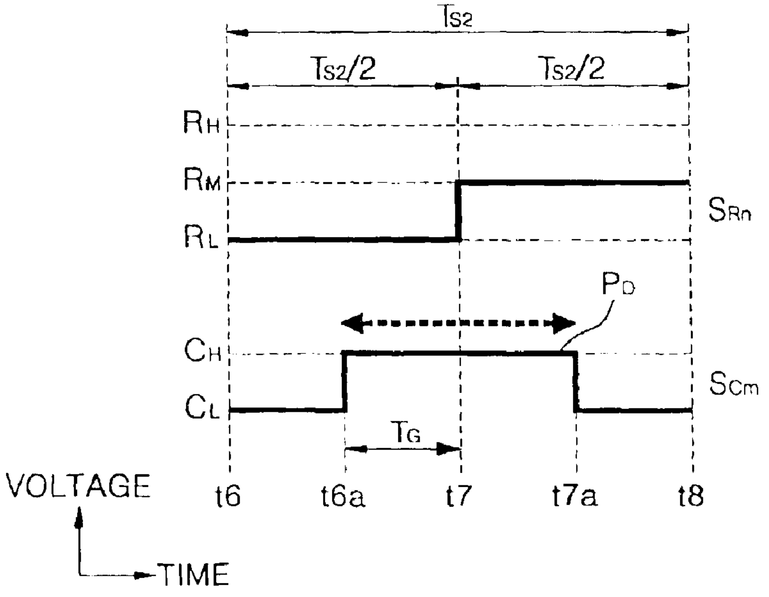
FIG. 4 is a timing diagram showing operations during a selection time shown in FIG. 3 in detail.
Figure 5:
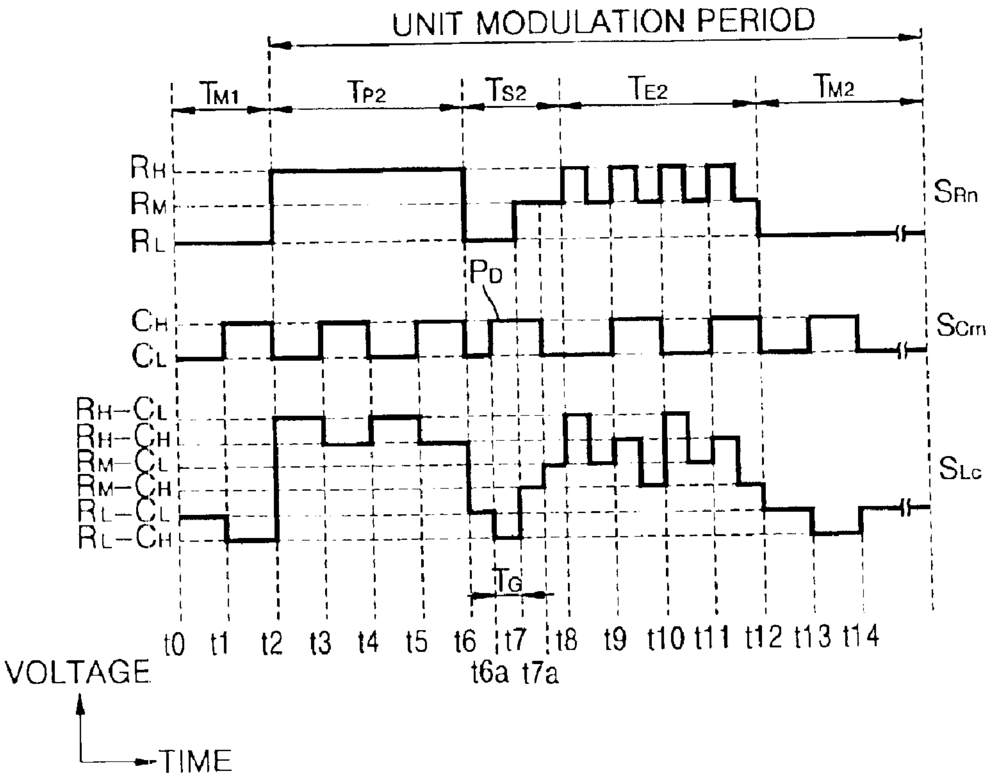
FIG. 5 is a timing diagram showing the waveform of a signal which is applied to a certain cholesteric liquid crystal cell according to the driving method shown in FIG. 3.

FIG. 3 shows a method of dynamically driving a cholesteric liquid crystal display (LCD) panel according to the principles of the present invention. In FIG. 3, reference character $S_{Rn}$ denotes a driving signal applied to an n-th scan electrode line, reference character $S_{Cm}$ denotes a data signal applied to a m-th data electrode line, and reference character $T_{M1}$ denotes a maintenance time in the previous modulation period. FIG. 4 illustrates a timing diagram showing detailed operations during the selection time $T_{S2}$ of FIG. 3. In FIGS. 3 and 4, the same reference characters denote elements having the same functions. FIG. 5 is a timing diagram showing the waveform of a signal which is applied to a certain cholesteric liquid crystal cell according to the driving method shown in FIG. 3. In FIG. 5, reference character $SL_C$ denotes a signal which is applied to a cholesteric liquid crystal cell at the intersection between the n-th scan electrode line and the m-th data electrode line.

Referring to FIGS. 3 through 5, in a method of dynamically driving a cholesteric liquid crystal display panel according to the present invention, a unit modulation period, which is applied to each row electrode line, that is, each scan electrode line, includes a preparation time $T_{P2}$, a selection time $T_{S2}$, an evolution time $T_{E2}$, and a maintenance time $T_{M2}$.

During the preparation time $T_{P2}$, a preparation line voltage $R_H$ is applied to the n-th scan electrode line of the cholesteric liquid crystal display panel so that all cholesteric liquid crystal cells of the n-th scan electrode line change into the homeotropic state H shown in FIG. 1. A preparation cell voltage, i.e., a first voltage, which is applied to all of the cholesteric liquid crystal cells of the n-th scan electrode line during the preparation time $T_{P2}$, is determined by data signals $C_H$<->$C_L$ (see FIG. 5), which are applied to data electrode lines during selection times for other scan electrode lines. This phenomenon is referred to as crosstalk, which inevitably occurs while driving a matrix liquid crystal display panel.

However, in the present invention, for a selection time, for example, the selection time $T_{S2}$, only a time point, at which a data pulse having a width corresponding to time t6_a_–t7_a_ which is half of the unit selection time $T_{S2}$ is applied, changes according to gray scale. Accordingly, a root-mean-square (RMS) voltage applied to all data electrode lines is constant regardless of the gray scale. Consequently, a voltage which is applied to cholesteric liquid crystal cells of scan electrode lines which are not scanned is constant, thereby removing crosstalk. For example, a preparation cell voltage, i.e., a first voltage, which is applied to all of the cholesteric liquid crystal cells of the n-th scan electrode line during the preparation time $T_{P2}$, is not changed by the data signals $C_H$<->$C_L$, which are applied to data electrode lines during selection times for other scan electrode lines.

Each selection time, for example, the selection time $T_{S2}$, during which selection line voltages $R_L$ and $R_M$ are applied to a certain or particular scan electrode line, and simultaneously, data signals are applied to all data electrode lines, is always constant. The selection time $T_{S2}$ is divided into a first part and a second part. The first part of the selection time $T_{S2}$ is also known as 'first part time t6–t7' corresponding to the time t6–t7. The second part of the selection time $T_{S2}$ is also known as 'second part time t7–t8' corresponding to the time t7–t8.

During the first part time t6–t7, the low selection line voltage $R_L$ is applied to the n-th scan electrode line. During the second part time t7–t8, the high selection line voltage $R_M$ higher than the low selection line voltage $R_L$ is applied to the n-th scan electrode line. In addition, during the selection time $T_{S2}$, a data pulse $P_D$ having a width corresponding to the first or second part time t6–t7 or t7–t8 is applied to all data electrode lines, and an application time point t6*a* of the data pulse $P_D$ varies with the gray scale level of a relevant or respective cholesteric liquid crystal cell.

More specifically, during the selection time $T_{S2}$, the data pulse $P_D$ is applied to cholesteric liquid crystal cells having the highest gray scale level at the earliest time t6*a*. Here, the time $T_G$ between the application time point t6*a* and the middle point t7 of the selection time $T_{S2}$ occupies the entire first part time t6–t7. In this case, a ratio of the data pulse $P_D$ to the first part time t6–t7, i.e., a gray-scale ratio $2T_G/T_{S2}$, is 1. Accordingly, a negative voltage having a level corresponding to the difference ($R_L-C_H$) between the low selection line voltage $R_L$ and a high data voltage $C_H$ is continuously applied to cholesteric liquid crystal cells having the highest gray scale level during the first part time t6–t7. In addition, a high positive voltage, which has a level corresponding to the difference ($R_M-C_L$) between the high selection line voltage $R_M$ and a low data voltage $C_L$, is continuously applied to the cholesteric liquid crystal cells having the highest gray scale level during the second part time t7–t8. Accordingly, the cholesteric liquid crystal cells having the highest gray scale level maintain the homeotropic state H during the selection time $T_{S2}$. Here, since the negative voltage having the level corresponding to the difference ($R_L-C_H$) is continuously applied during the first part time t6–t7, the cholesteric liquid crystal cells are prevented from relaxing into the transient-planar state.

In contrast, during the selection time $T_{S2}$, the data pulse $P_D$ is applied to cholesteric liquid crystal cells having the lowest gray scale level at a latest time point t7. Here, the time $T_G$ between the application time point t6*a* and the middle point t7 of the selection time $T_{S2}$ is zero. In this case, a gray-scale ratio $2T_G/T_{S2}$ is 0. Accordingly, a differential voltage ($R_L-C_L$) between the low selection line voltage $R_L$ and the low data voltage $C_L$ is continuously applied to the cholesteric liquid crystal cells having the lowest gray scale level during the first part time t6–t7. Actually, since the low selection line voltage $R_L$ has the same level as the low data voltage $C_L$, no voltage is applied to the cholesteric liquid crystal cells having the lowest gray scale level during the first part time t6–t7. In addition, a low positive voltage, which has a level corresponding to the difference ($R_M-C_H$) between the high selection line voltage $R_M$ and the high data voltage $C_L$, is continuously applied to the cholesteric liquid crystal cells having the lowest gray scale level during the second part time t7–t8. Accordingly, the cholesteric liquid crystal cells having the lowest gray scale level relax into the transient-planar state. Here, since no voltage is applied during the first part time t6–t7, the cholesteric liquid crystal cells freely relax into the transient-planar state without any constraint.

To put it briefly, the cholesteric liquid crystal cells having the highest gray scale level maintain the homeotropic state H while the cholesteric liquid crystal cells having the lowest gray scale level relax into the transient-planar state. In addition, cholesteric liquid crystal cells having other gray scale levels maintain a state similar to the homeotropic state H as the gray scale level increases and change into a state similar to the transient-planar state as the gray scale level decreases. Since only an application time point (t6*a* in the case of the selection time $T_{S2}$) of a data pulse having the width (t6*a*–t7*a* in the case of the selection time $T_{S2}$) corresponding to half of a unit selection time (e.g., $T_{S2}$) during the unit selection time varies with gray scale, a root-mean-square voltage applied to all data electrode lines is constant regardless of the gray scale. Consequently, a voltage which is applied to cholesteric liquid crystal cells of scan electrode lines which are not scanned is constant, thereby removing crosstalk.

During the evolution time $T_{E2}$, the preparation line voltage $R_H$ and the high selection line voltage $R_M$ are alternately applied to the n-th scan electrode line. That is, the root-mean-square voltage of the two voltages $R_H$ and $R_M$, i.e., a fourth voltage $\sqrt{R_{H^2}+R_{M^2}}$, is applied to the n-th scan electrode line. Accordingly, while the cholesteric liquid crystal cells having the highest gray scale level maintain the homeotropic state H, the cholesteric liquid crystal cells having the lowest gray scale level change into the focal conic state F shown in FIG. 1. The cholesteric liquid crystal cells having other gray scale levels maintain the state similar to the homeotropic state as the gray scale level increases and change into a state similar to the focal conic state as the gray scale level decreases.

In the meantime, during the evolution time $T_{E2}$, the fourth voltage $\sqrt{R_{H^2}+R_{M^2}}$ is applied to the n-th scan electrode line so that the number of output voltage levels of a scan-electrode driving device can be reduced to 3, thereby simplifying the internal circuit of the device and decreasing the manufacturing costs. In addition, as described above, an evolution cell voltage, which is applied to all cholesteric liquid crystal cells of the n-th scan electrode line during the evolution time $T_{E2}$, is not changed by the data signals $C_H$<->$C_L$, which are applied to the data electrode lines during selection times for other scan electrode lines.

During the maintenance time $T_{M2}$, a voltage equal to the low selection line voltage $R_L$ is applied to the n-th scan electrode line so that the cholesteric liquid crystal cells having the highest gray scale level relax into the planar state P shown in FIG. 1 while the cholesteric liquid crystal cells having the lowest gray scale level maintain the focal state F. In addition, the cholesteric liquid crystal cells having other gray scale levels change into a state similar to the planar state P as the gray scale level increases and maintain the state similar to the focal conic state F as the gray scale level decreases. Accordingly, the cholesteric liquid crystal cells having the highest gray scale level reflect light, which has a wavelength corresponding to the product nP of an average refractive index "n" and a helical pitch P, most. However, the cholesteric liquid crystal cells having the lowest gray scale level transmit light in an almost transparent state. The reflectivity of the cholesteric liquid crystal cells having other gray scale levels increases as the gray scale level increases and decreases as the gray scale level decreases. In addition, as described above, a maintenance cell voltage, which is applied to all cholesteric liquid crystal cells of the n-th scan electrode line during the maintenance time $T_{M2}$, is not changed by the data signals $C_H$<->$C_L$, which are applied to the data electrode lines during selection times for other scan electrode lines.

Meanwhile, when the polarity of a driving voltage applied to all cholesteric liquid crystal cells is inverted with a unit modulation period, a mean direct current (DC) voltage can be removed, thereby preventing the physical properties of cholesteric liquid crystal from changing. In another embodiment of the present invention, the polarity of a driving voltage applied to all cholesteric liquid crystal cells can be inverted with a unit modulation period without using an extra negative voltage. More specifically, for the data signal $S_{Cm}$, a voltage $C_L$(M) having a level equal to the preparation line voltage $R_H$, e.g., 32 V, is used instead of the low data voltage $C_L$, e.g., 0 V, and a voltage $C_H$(M) having a level of $C_L$(M)–$C_H$, e.g., 27 V, is used instead of the high data voltage $C_H$, e.g., 5 V. In addition, for the scan signal $S_{Rn}$, while the high selection line voltage $R_M$ is maintained, the preparation line voltage $R_H$ and the low selection line voltage $R_L$ are in opposition to each other in two consecutive unit modulation periods. For example, in a case where inversion driving is performed with a unit modulation period, during the maintenance time $T_{M1}$ in previous unit modulation period, a high maintenance line voltage $R_H$ is applied to the n-th scan electrode line, while the voltages $C_L$(M) and $C_H$(M) resulting from crosstalk are applied to the m-the data electrode line. During such inversion driving, only the polarity of a driving voltage applied to all cholesteric liquid crystal cells changes, and the operations are the same as those described above.

Figure 6:
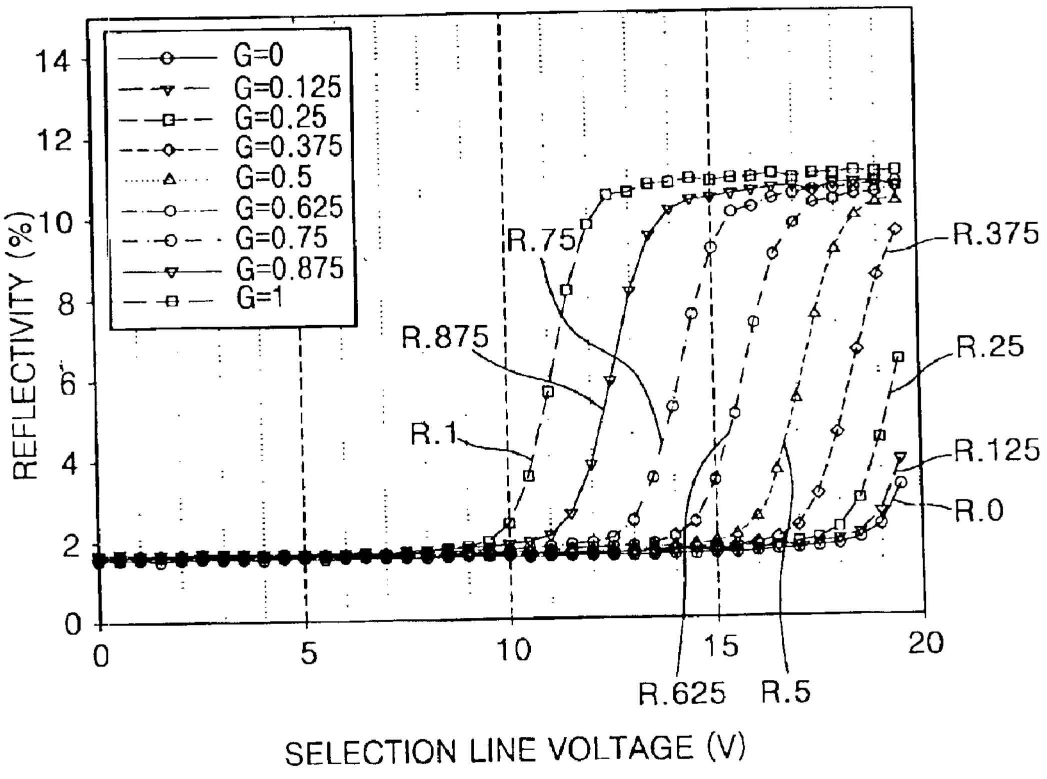
FIG. 6 is a graph of the reflectivity of cholesteric liquid crystal cells versus a selection line voltage, which is applied to a scan electrode line during a second part time shown in FIG. 3, when a time point, at which a data pulse shown in FIGS. 3 and 4 is applied, varies.

FIG. 6 shows the reflectivity of cholesteric liquid crystal cells versus the high selection line voltage $R_M$, which is applied to a scan electrode line during the second part time t7–t8 shown in FIG. 3, when the application time point t6*a* of the data pulse $P_D$ shown in FIGS. 3 and 4 changes. In FIG. 6, a reference character R.1 denotes a characteristic curve when the gray-scale ratio $2T_G/T_{S2}$ is 1, a reference character R.875 denotes a characteristic curve when the gray-scale ratio $2T_G/T_{S2}$ is 0.875, a reference character R.75 denotes a characteristic curve when the gray-scale ratio $2T_G/T_{S2}$ is 0.75, a reference character R.625 denotes a characteristic curve when the gray-scale ratio $2T_G/T_{S2}$ is 0.625, a reference character R.5 denotes a characteristic curve when the gray-scale ratio $2T_G/T_{S2}$ is 0.5, a reference character R.375 denotes a characteristic curve when the gray-scale ratio $2T_G/T_{S2}$ is 0.375, a reference character R.25 denotes a characteristic curve when the gray-scale ratio $2T_G/T_{S2}$ is 0.25, a reference character R.125 denotes a characteristic curve when the gray-scale ratio $2T_G/T_{S2}$ is 0.125, and a reference character R.0 denotes a characteristic curve when the gray-scale ratio $2T_G/T_{S2}$ is 0.

Referring to FIG. 6, as the gray-scale ratio $2T_G/T_{S2}$ increases, a voltage, which is required to change cholesteric liquid crystal cells into a planar state having high reflectivity, decreases. In addition, it can be seen from FIG. 6 that difference in reflectivity with respect to all of the gray-scale ratios $2T_G/T_{S2}$ is appropriate when the high selection line voltage $R_M$ is about 16 V. In other words, when the high selection line voltage $R_M$ is about 16 V, best gray-scale display can be accomplished.

Figure 7:
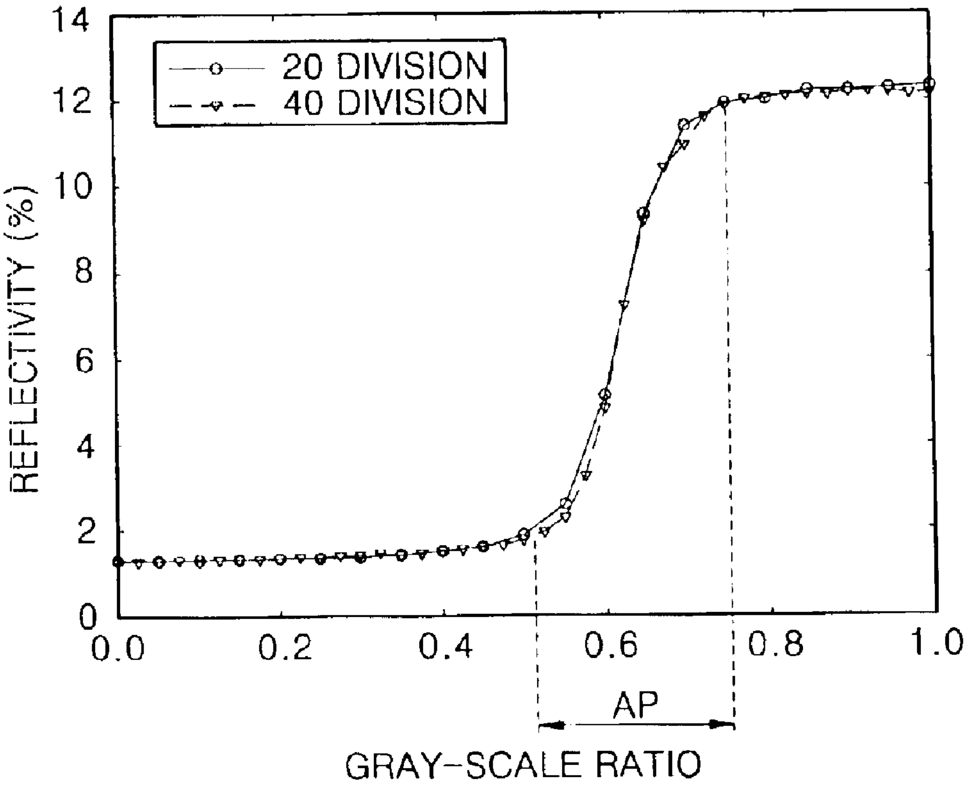
FIG. 7 is a graph of the reflectivity of cholesteric liquid crystal cells with respect to an application time point of a data pulse shown in FIGS. 3 and 4.

FIG. 7 shows the reflectivity of cholesteric liquid crystal cells with respect to the application time point t6*a* of the data pulse $P_D$ shown in FIGS. 3 and 4. More particularly, FIG. 7 shows the reflectivity of cholesteric liquid crystal cells versus the gray-scale ratio $2T_G/T_{S2}$ regarding the data pulse $P_D$. The graph shown in FIG. 7 is based on the result obtained when the gray-scale ratio $2T_G/T_{S2}$ is divided into 20 divisions and the result obtained when the gray-scale ratio $2T_G/T_{S2}$ is divided into 40 divisions. Referring to FIG. 7, difference in reflectivity is appropriate in the AP range of the gray-scale ratio $2T_G/T_{S2}$. That is, application of the AP range of the gray-scale ratio $2T_G/T_{S2}$ is most appropriate for gray-scale display.

As described above, in a method of driving a cholesteric liquid crystal display panel according to the present invention, since only an application time point of a data pulse having the width corresponding to half of a selection time varies with gray scale, a root-mean-square voltage, which is applied to all data electrode lines during a unit selection time, is constant regardless of the gray scale. Consequently, a voltage which is applied to cholesteric liquid crystal cells of scan electrode lines which are not scanned is constant, thereby removing crosstalk. Therefore, accurate gray-scale display can be accomplished.

The foregoing paragraphs describe the details of a method of driving a cholesteric liquid crystal display (LCD) panel, and more particularly, of a method of driving a cholesteric liquid crystal display panel by sequentially applying a selection line voltage to scan electrode lines of the cholesteric liquid crystal display panel and simultaneously applying data signals to all data electrode lines so that the state of each cholesteric liquid crystal cell is selected according to a given gray scale level.

While the present invention has been illustrated by the description of embodiments thereof, and while the embodiments have been described in considerable detail, it is not the intention of the inventor to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. A method of driving a cholesteric liquid crystal display panel having cholesteric liquid crystal cells, the method comprising the steps of:

during a selection time, applying at least one selection line voltage to a particular scan electrode line of the panel and substantially simultaneously applying data signals to all data electrode lines in order to select a state of the cholesteric liquid crystal cells in dependence upon a predetermined gray scale level, the selection time being a constant, the selection time being divided into a first part of the selection time and a second part of the selection time;

said applying of the at least one selection line voltage further comprising:

applying a low selection line voltage during the first part; and applying a high selection line voltage during the second part, the high selection line voltage having a level different from a level of the low selection line voltage;

said applying of the data signals further comprising applying a data pulse to all of the data electrode lines at different time points, the different time points being selected in dependence upon gray scale levels of respective ones of the cholesteric liquid crystal cells, the data pulse having a width corresponding to one selected from among the first part and the second part.

2. The method of claim 1, the selection time corresponding to a sequence of selection times; and said applying of the at least one selection line voltage and said applying of the data signals being sequentially performed during the sequence of selection times.

3. The method of claim 1, further comprising the step of:

before the selection time, applying a first predetermined voltage to all cholesteric liquid crystal cells of the panel to change all cholesteric liquid crystal cells of the relevant scan electrode line into a homeotropic state.

4. The method of claim 3, said applying of the first predetermined voltage being performed during a preparation step immediately prior to the selection time.

5. The method of claim 3, further comprising the steps of:

during the selection time, maintaining the homeotropic state in the cholesteric liquid crystal cells having a highest gray scale level;

during the selection time, relaxing the state of the cholesteric liquid crystal cells having a lowest gray scale level into a transient-planar state; and during the selection time, in the cholesteric liquid crystal cells not having the highest gray scale level and not having the lowest gray scale level, changing the state of the cholesteric liquid crystal cells into a state similar to the homeotropic state when the gray scale level increases, and changing the state of the cholesteric liquid crystal cells into a state similar to the transient-planar state when the gray scale level decreases.

6. The method of claim 5, further comprising the step of:

after the selection time, applying a second predetermined voltage to all of the cholesteric liquid crystal cells of the panel to maintain the homeotropic state in the cholesteric liquid crystal cells having the highest gray scale levels, and to change the state of the cholesteric liquid crystal cells having the lowest gray scale level into a focal conic state; and said applying of the second predetermined voltage changing the cholesteric liquid crystal cells not having the highest gray scale level and not having the lowest gray scale level into a state similar to the homeotropic state when the gray scale level increase and into a state similar to the focal conic state when the gray scale level decreases.

7. The method of claim 6, said applying of the second predetermined voltage being performed during an evolution step immediately after the selection time.

8. The method of claim 7, further comprising the step of:

after the evolution step, applying a third predetermined voltage to all of the cholesteric liquid crystal cells of the panel to relax the state of the cholesteric liquid crystal cells having the highest gray scale level into a planar state, and to maintain the focal conic state of the cholesteric liquid crystal cells having the lowest gray scale level;

said applying of the third predetermined voltage changing the cholesteric liquid crystal cells not having the highest gray scale level and not having the lowest gray scale level into a state similar to the planar state when the gray scale level increase, and into a state similar to the focal conic state when the gray scale level decreases.

9. The method of claim 1, further comprising the steps of:

during the selection time, maintaining a homeotropic state in the cholesteric liquid crystal cells having a highest gray scale level;

during the selection time, relaxing the state of the cholesteric liquid crystal cells having a lowest gray scale level into a transient-planar state; and during the selection time, in the cholesteric liquid crystal cells not having the highest gray scale level and not having the lowest gray scale level, changing the state of the cholesteric liquid crystal cells into a state similar to the homeotropic state when the gray scale level increases, and changing the state of the cholesteric liquid crystal cells into a state similar to the transient-planar state when the gray scale level decreases.

10. The method of claim 1, further comprising the step of:

after the selection time, applying a predetermined voltage to all of the cholesteric liquid crystal cells of the panel to maintain a homeotropic state in the cholesteric liquid crystal cells having the highest gray scale level, and to change the state of the cholesteric liquid crystal cells having the lowest gray scale level into a focal conic state;

said applying of the predetermined voltage changing the cholesteric liquid crystal cells not having the highest gray scale level and not having the lowest gray scale level into a state similar to the homeotropic state when the gray scale level increases and into a state similar to the focal conic state when the gray scale level decreases.

11. A method of driving a liquid crystal display panel, the method comprising:

during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level, the selection time being a constant, the selection time being divided into a first part of the selection time and a second part of the selection time;

said applying of the data signals further comprising applying a data pulse to all of the data electrode lines at different time points, the different time points being selected in dependence upon gray scale levels of respective ones of the cholesteric liquid crystal cells, the data pulse having a width corresponding to one selected from among the first part and the second part.

12. The method of claim 11, further comprising the step of:

before the selection time, applying a predetermined voltage to all cholesteric liquid crystal cells of the panel to change all cholesteric liquid crystal cells of the relevant scan electrode line into a homeotropic state.

13. The method of claim 11, further comprising the steps of:

during the selection time, maintaining a homeotropic state in the cholesteric liquid crystal cells having a highest gray scale level;

during the selection time, relaxing the state of the cholesteric liquid crystal cells having a lowest gray scale level into a transient-planar state; and during the selection time, in the cholesteric liquid crystal cells not having the highest gray scale level and not having the lowest gray scale level, changing the state of the cholesteric liquid crystal cells into a state similar to the homeotropic state when the gray scale level increases, and changing the state of the cholesteric liquid crystal cells into a state similar to the transient-planar state when the gray scale level decreases.

14. The method of claim 11, further comprising the step of:

after the selection time, applying a predetermined voltage to all of the cholesteric liquid crystal cells of the panel to maintain a homeotropic state in the cholesteric liquid crystal cells having the highest gray scale level, and to change the state of the cholesteric liquid crystal cells having the lowest gray scale level into a focal conic state;

said applying of the predetermined voltage changing the cholesteric liquid crystal cells not having the highest gray scale level and not having the lowest gray scale level into a state similar to the homeotropic state when the gray scale level increase, and into a state similar to the focal conic state when the gray scale level decreases.

15. The method of claim 11, further comprising the step of:

after the selection time, applying a predetermined voltage to all of the cholesteric liquid crystal cells of the panel to relax the state of the cholesteric liquid crystal cells having the highest gray scale level into a planar state, and to maintain a focal conic state of the cholesteric liquid crystal cells having the lowest gray scale level;

said applying of the predetermined voltage changing the cholesteric liquid crystal cells not having the highest gray scale level and not having the lowest gray scale level into a state similar to the planar state when the gray scale level increase, and into a state similar to the focal conic state when the gray scale level decreases.

16. A method of driving a cholesteric liquid crystal display panel, the method comprising the steps of:

during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level;

during the selection time, maintaining a homeotropic state in the cholesteric liquid crystal cells having a highest gray scale level; and during the selection time, relaxing the state of the cholesteric liquid crystal cells having a lowest gray scale level into a transient-planar state.

17. The method of claim 16, further comprising the step of:

before the selection time, applying a predetermined voltage to all cholesteric liquid crystal cells of the panel to change all cholesteric liquid crystal cells of the relevant scan electrode line into a homeotropic state.

18. The method of claim 16, further comprising the step of:

during the selection time, in the cholesteric liquid crystal cells not having the highest gray scale level and not having the lowest gray scale level, changing the state of the cholesteric liquid crystal cells into a state similar to the homeotropic state when the gray scale level increases, and changing the state of the cholesteric liquid crystal cells into a state similar to the transient-planar state when the gray scale level decreases.

19. A method of driving a cholesteric liquid crystal display panel, the method comprising the steps of:

during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level; and after the selection time, applying a predetermined voltage to all of the cholesteric liquid crystal cells of the panel to maintain a homeotropic state in the cholesteric liquid crystal cells having the highest gray scale level and to change the state of the cholesteric liquid crystal cells having the lowest gray scale level into a focal conic state.

20. A method of driving a cholesteric liquid crystal display panel, further the method comprising the steps of:

during a selection time, applying at least one selection line voltage to a particular scan electrode line of the panel and substantially simultaneously applying data signals to all data electrode lines in order to select a state of cholesteric liquid crystal cells of the panel in dependence upon a predetermined gray scale level; and after the selection time, applying a predetermined voltage to all of the cholesteric liquid crystal cells of the panel to relax the state of the cholesteric liquid crystal cells having the highest gray scale level into a planar state and to maintain a focal conic state of the cholesteric liquid crystal cells having the lowest gray scale level.

* * * * *